United States Patent [19]

Anthony

[11] Patent Number: 5,004,634
[45] Date of Patent: Apr. 2, 1991

[54] PROTECTIVE COVER FOR AUTOMOTIVE TAPE PLAYER

[76] Inventor: Shane L. Anthony, 3140-K S. Peoria St., Ste. 257, Aurora, Colo. 80014

[21] Appl. No.: 470,969

[22] Filed: Jan. 26, 1990

[51] Int. Cl.$^5$ .............................................. F41H 3/00
[52] U.S. Cl. .......................................... 428/31; 180/90; 248/27.1; 296/70; 428/100; 428/919; 455/345
[58] Field of Search ........................... 180/90; 296/70; 455/345; 428/31, 100, 919; 248/27.1

[56] References Cited

U.S. PATENT DOCUMENTS

| | | | |
|---|---|---|---|
| 3,582,965 | 6/1971 | DeMetrick | 455/344 X |
| 3,606,447 | 9/1971 | Ryding | 296/37.12 |
| 3,606,448 | 9/1971 | Walker | 296/105 |
| 3,799,483 | 3/1974 | Chiappinelli | 248/27.3 |
| 4,068,175 | 1/1978 | Maniaci | 455/345 |
| 4,221,380 | 9/1980 | Miller et al. | 428/31 X |
| 4,248,069 | 2/1981 | Burbank | 455/345 X |
| 4,280,226 | 7/1981 | Jenkins | 455/345 |
| 4,365,280 | 12/1982 | Crosetti et al. | 428/919 X |
| 4,532,162 | 7/1985 | Neece | 428/31 |
| 4,584,717 | 4/1986 | Strickland | 428/919 X |
| 4,623,992 | 11/1986 | Kurosaki et al. | 455/347 X |
| 4,846,382 | 7/1989 | Foultner et al. | 180/90 X |
| 4,918,750 | 4/1990 | Buckley | 455/345 |

OTHER PUBLICATIONS

Velcro Hook and Loop Fastener, Advertising Industrial Design, Jan.-Feb. 1971.
Velcro Fastening Systems, SAE 1980, Cobo Hall, Detroit, Mich., Feb. 25, 1980.

*Primary Examiner*—Henry F. Epstein
*Attorney, Agent, or Firm*—Duane Burton

[57] ABSTRACT

A protective cover for concealing the visible exterior of a tape player or the like mounted in a vehicle dashboard. The protective cover comprises a face plate, a tubular extension member that encloses the visible portion and control knobs of the tape player, a mounting blank which inserts into the tape cartridge opening of the tape player, and adjustable fastening means for hingedly attaching the mounting blank to the face plate and extension member. In use the face plate may be mounted at an angle which conforms to the slope of the dashboard. Additionally, indicia such as decals may be attached to the exterior of the face plate to resemble dashboard components.

20 Claims, 1 Drawing Sheet

PROTECTIVE COVER FOR AUTOMOTIVE TAPE PLAYER

FIELD OF THE INVENTION

This invention relates to automotive anti-theft devices and more particularly to a novel protective cover for concealing the presence of an electronic item such as a tape player in an automobile.

BACKGROUND OF THE INVENTION

Automobiles are often equipped with expensive radios and magnetic tape players. These electronic items are typically included in a single assembly mounted to the dashboard of the car. Because of their usefulness and resale value these stereo radio tape players are popular items for theft. In a typical situation, a thief will spot the radio through the car window. If it is one he wants, he proceeds to break into the car and forcibly remove the radio assembly from the dashboard. The car owner thus suffers not only the loss of the electronic equipment but also the expense of the damage to the car.

In the past, various covers have been proposed for the purpose of concealing a normally visible radio assembly in an automobile. U.S. Pat. No. 4,532,162 to Neece for instance, discloses a simple cover plate for a car radio that is fastened to the control knobs of the radio.

U.S. Pat. No. 4,365,280 to Crosetti discloses a panel that is fastened to the cassette opening of the tape player of a radio to disguise the equipment as an inexpensive AM radio.

U.S. Pat. No. 4,584,717 to Strickland discloses a closure for a radio assembly that also attaches to the cassette opening of the tape player to enclose the radio and tape player assembly.

There are various problems associated with these prior art anti theft devices for automotive tape players. In general they must be sized for a particular tape player and are not universally adaptable to different sized tape players. Additionally, they may not be adaptable for use with tape players having irregular configurations such as occurs with the tape cartridge opening of the tape player being offset from the controls of the tape player or with dashboards having sloped or angled surfaces. Moreover, a tape player disguised as a radio may still appear as an attractive item for a thief and should be avoided.

The present invention is directed to a simple, yet unobvious protective cover for automotive tape players that overcomes these prior art limitations. In particular, the protective cover of the invention is adapted to securely attach to a variety of tape players having different sizes and configurations and to a variety of sloped or angled dashboards. Additionally, the protective cover of the invention can be modified with decals to resemble components on the dashboard other than a radio. Moreover, the protective cover completely encloses the visible portion of the tape player and functions to shield the tape player from dirt and sunlight.

SUMMARY OF THE INVENTION

In accordance with the present invention, a protective cover for automotive tape players or the like is provided. The protective cover in general, comprises, a face plate, an extension member which attaches to the face plate and encloses the control knobs and visible portion of the tape player, a mounting block insertable into the tape cartridge opening of the tape player, and adjustable fastening means for fastening the mounting block to the cover plate and extension members.

In use, the protective cover may be removably and adjustably fastened to the tape player over its visible portion such that the tape player is not visible to a would-be thief looking into the automobile through a window. Decals or other indicia may be attached to the face plate to simulate dashboard instruments, lettering, or emblems to further conceal the tape player. Additionally, the face plate may be adjustably sloped to match the angle of the surface of the dashboard. Moreover, the extension member may be sized in different lengths for concealing control knobs of different lengths found on different tape players.

A more complete understanding of the invention can be had by reference to the accompanying drawing and the detailed description which follows.

DESCRIPTION OF THE PREFERRED EMBODIMENT

Figure 1:
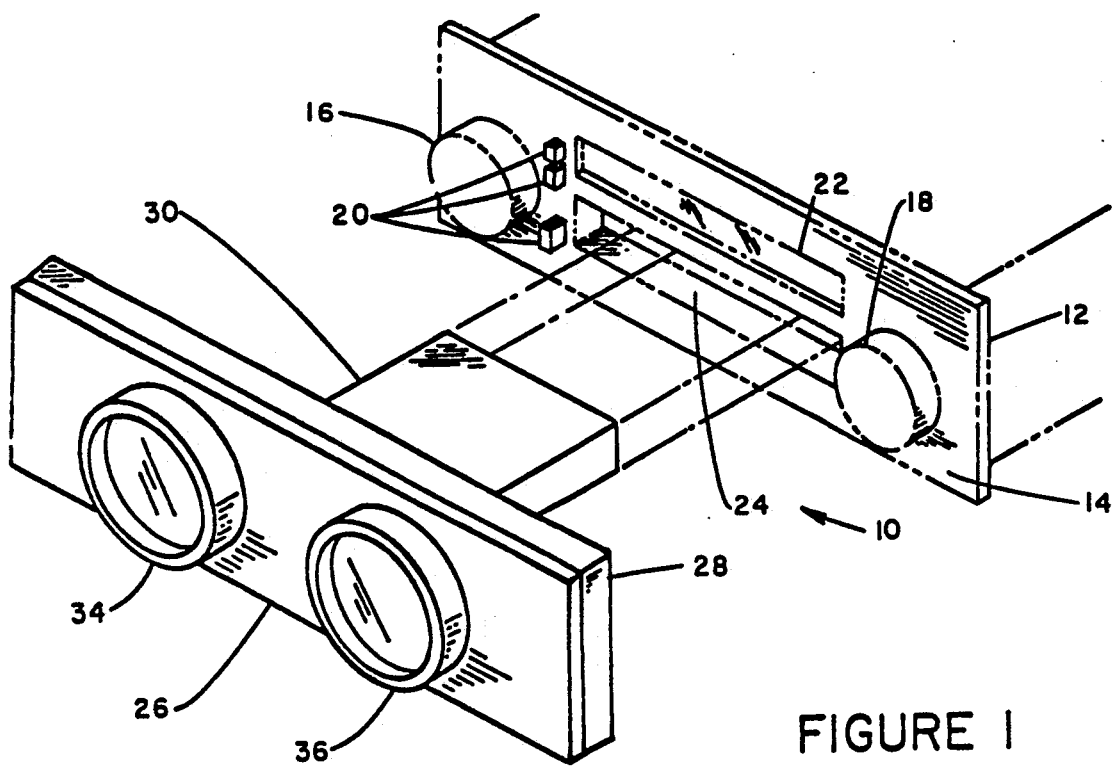
FIG. 1 is a perspective view of a protective cover for a tape player constructed in accordance with the invention and shown prior to attachment to the tape player.
Figure 2:
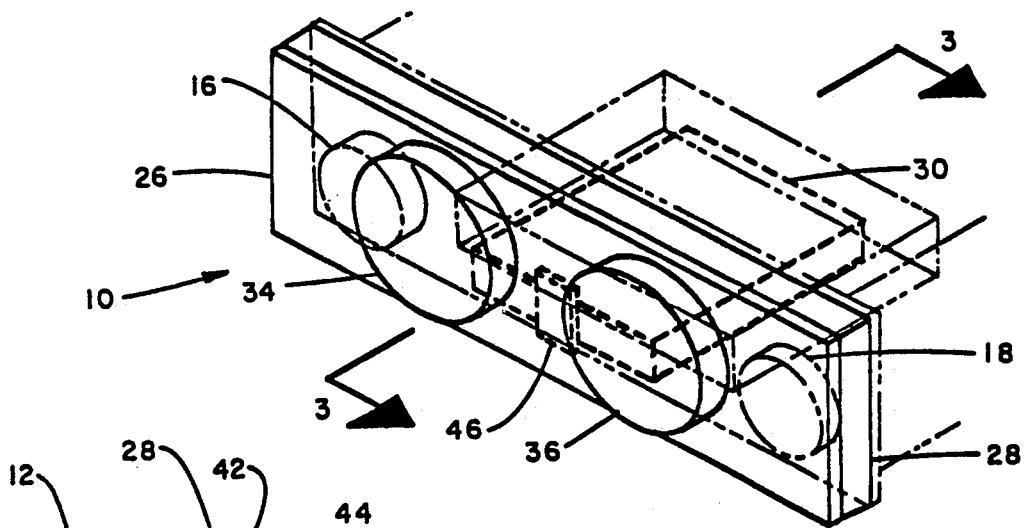
FIG. 2 is a perspective view of a protective cover for a tape player constructed in accordance with the invention and shown attached to a tape player.
Figure 3:
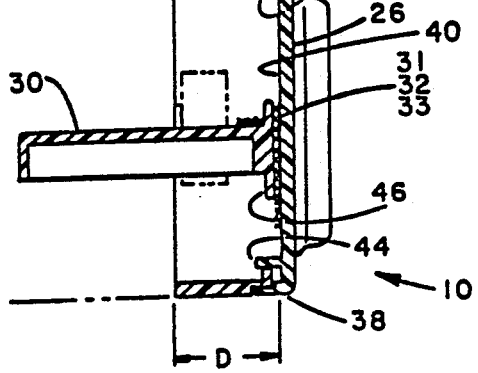
FIG. 3 is a cross sectional elevation view taken along section line 3—3 of FIG. 2.

Referring now to FIGS. 1-3, a protective cover 10 constructed in accordance with the invention is shown. The protective cover 10 is intended for use with an automotive tape player 12 or the like. As used herein the term tape player 10 indicates an automotive magnetic tape player which may also include other components such as a radio or CD player. The protective cover 10 of the invention functions to conceal the tape player 12 so that it is less likely to be seen by a thief and stolen. Additionally the protective cover 10 of the invention functions to help seal the tape player 12 from sunlight and dirt.

As shown in FIG. 1, the tape player 12 is mounted to the dashboard of an automobile. The tape player 12 includes a visible exterior portion 14 having control knobs 16, 18 and a plurality of control buttons 20 mounted thereon. The visible exterior portion 14 of the tape player 12 may also include a viewing portion 22 such as a calibrated dial face or an LCD display for viewing the radio station selection or other data. The exterior portion 14 of the tape player 12 may also include a tape cartridge opening 24 generally rectangular in shape and adapted to receive a magnetic tape cassette or the like. As shown in FIG. 1, the control knobs 16, 18 extend a distance out from the visible exterior portion 14 of the tape player 12.

The protective cover 10 of the invention, generally stated, comprises; a face plate 26, a generally tubular shaped extension member 28 which attaches to the face plate 26, a mounting blank 30 shaped as a cassette blank and insertable into the tape cartridge opening 24 of the tape player 12, and adjustable fastening means in the form of a plurality of adhesive backed hook and loop fasteners 31, 32, 33 for adjustably attaching the mounting blank 30 to the face plate 26 and extension member 28.

The face plate 26 of the protective cover 10 is a generally flat plate generally rectangular in shape. As shown in FIG. 3, the face plate 26 includes a 90 degree peripheral edge portion 38 along its outer perimeter which as will hereinafter be explained, attaches the face plate 26 to the extension member 28. The face plate 26 is preferably constructed of a hard plastic material colored and textured to resemble the materials used on most automotive dashboards. As will hereinafter be more fully explained, because the face plate 26 can be adjustably mounted to the tape player 12 it may be angled or sloped to match the slope of the dashboard and thus visually appear as part of the dashboard of the automobile. It is contemplated that a would-be thief looking through a window into the passenger compartment of the automobile would view the face plate 26 as part of the dashboard and conclude that the automobile had no radio or tape player 12.

This illusion may be enhanced by the addition of indicia such as decals 34, 36 that simulate automotive instruments such as temperature or pressure gages. Alternately, other decals formed as emblems, letters or other artwork may be added to the face plate consistent with items found on an automotive dashboard. The face plate 26 for instance may include letters which indicate the make or body style of the automobile.

As shown in FIG. 2, the generally tubular shaped extension member 28 of the protective cover 10 removably attaches to face plate 26. It is to be understood however that the extension member 28 and face plate 26 may also be constructed as a unitary structure. The extension member 28 functions to enclose the control knobs 16, 18 and other control buttons 20 of the tape player which extend from the visible exterior portion 14 of the tape player 12. The extension member 28 is four-sided, generally tubular in shape, and is formed with an outer peripheral configuration which matches the shape and size of the generally rectangular shaped face plate 26.

As shown in FIG. 3, the extension member 28 includes a recessed outer edge 42. In use, of the protective cover 10, the face plate 26 is snapped onto the extension member 28 with the recessed outer edge 42 of the extension member engaging the 90 degree peripheral edge portion 38 of the face plate 26. The 90 degree peripheral edge portion 38 of the face plate 26 and recessed outer edge 42 of the extension member can be sized and shaped to provide a nestable snap fit between the mating elements, as is known in the art. Additionally, spaced tabs 44 (FIG. 3) may be formed on the inner surface 40 of the face plate 26 for further retaining the face plate 26 on the extension member 28.

The extension member 28 may be formed with a depth D (FIG. 3) deep enough to cover the controls knobs 16, 18 and control button 20 on the tape player 14, yet shallow enough to give the apperance that the protective cover 10 is part of the dashboard. As previously stated, the face plate 26 is removably attached to the extension member because it is contemplated that different extension members 28 may be utilized having a depth which corresponds to the length of the control knobs 16, 18 on different tape players. Alternately, the face plate 26 and extension member 28 may be formed as a unitary structure.

Moreover, the face plate 26 and extension member 28 may be formed with an outer peripheral size which allows the viewing panels on most automotive tape players to be enclosed. By way of example only, and not by limitation the inventor has found a peripheral size of 7¼" length ×2¼" width for the face plate 26 and extension members 28 to be suitable for enclosing the visible exterior portion 14 of most tape players. Additionally, a depth "D" of between ⅜" to 1⅜" is suitable for enclosing the control knobs 16, 18 and control buttons 20 for most tape players 12.

Referring now to FIG. 1, the mounting blank 30 of the protective cover 10 is shown. The mounting blank 30 is sized and shaped to approximately match the outer size and shape of a standard sized cassette tape cartridge. The mounting blank 30 however, is formed with a length which is less than the length of a standard sized cassette tape cartridge such that when the mounting blank 30 is inserted into the tape cartridge opening 22, the tape retaining mechanism of the tape player 12 is not engaged by the mounting blank 30 and the mounting blank 30 does not interfere with the internal function of the tape player 12. The mounting blank 30 may thus be inserted into the tape cartridge opening 24 of the tape player 12 and supported by the interior surface of the tape player 12.

The mounting blank 30 may also include a flat abutment tab 46 (FIG. 3) attached to or formed integrally on the mounting blank 30. The abutment tab 46 functions to provide a stop for preventing the mounting blank 30 from being pushed all the way into the tape player 12. Additionally the abutment tab 46 functions to provide an additional surface for attaching the mounting blank 30 to the inner surface 40 of the face plate 26.

Figure 4:
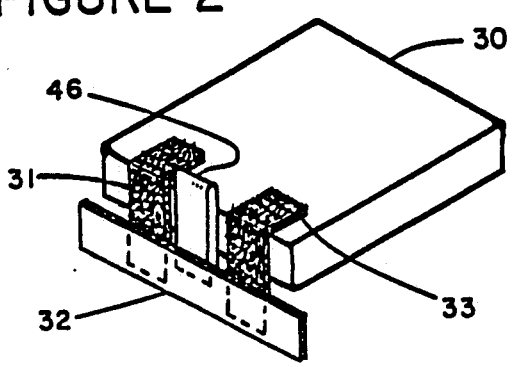
FIG. 4 is a perspective view with parts removed showing the assembly of the adjustable fastening means of the invention.

Referring now to FIG. 4, the adjustable attachment means of the protective cover 10 is shown. The attachment means functions to adjustably and hingedly attach the mounting blank 30 to the face plate 26. The attachment means generally stated is a non rigid material that when attached to the mounting blank 30 and the face plate 26, permits the face plate 26 to be mounted at a slight angle in such a manner as to better conform with dashboard slopes or irregularities. This permits a more precise and cosmetically appropriate fit of the face plate 26 with the dashboard. The attachment means thus provides a "flexible hinge" between the face plate 26 and mounting blank 30. The "flexible hinge" also allows the protective cover 10 to be more easily stored when not in use as the mounting blank 30 may be folded flat against the face plate 26 for storage.

In a preferred embodiment of the invention the attachment means comprises a plurality hook and loop fasteners 31, 32, 33 such as "Velcro" fasteners. The hook and loop fasteners 31, 32, 33 preferably include an adhesive backing for attaching the fasteners 31, 32, 33 to the mounting blank 30 and inner surface 40 of the face plate 26.

As shown in FIG. 4, two hook fasteners 31 and 33 may be adhered to the mounting blank 30 and disposed in a generally vertical orientation. A single mating loop fastener 32 disposed in a generally horizontal orientation may be adhered to the face plate 26 (not shown in FIG. 4). This forms an adjustable hinge-like connection between the mounting blank 30 and face plate 26.

As shown in FIG. 1, in use the mounting blank 30 inserts into the tape cartridge opening 24 of the tape player 12. The face plate 26 and extension member 28 can then be centered over the visible exterior portion of the tape player and fastened to the mounting blank 30 with the adjustable "Velcro" fasteners 31, 32, 33. Moreover, the face plate 26 and extension member 28 may be angled with respect to the mounting blank 30 to match the slope or angle of the dashboard.

Additionally, the use of this type of adjustable fastener allows the fastened elements (face plate 26 and mounting blank 30) to be easily unfastened and adjusted or aligned with one another and the tape player 12, as required, for a specific installation. If for instance, the tape cartridge opening 24 on a tape player 12 is offset from the center of the tape player 12, this adjustable fastening arrangement would allow the face plate 26 to be centered over the visible exterior portion 14 of the tape player 12 and fastened to the mounting blank 30. It is to be understood however that adjustable fastening means other than the "Velcro" fasteners disclosed would also be suitable for this application.

In addition to concealing the tape player 12, the protective cover 10 completely encloses the visible outer surface 14 of the tape player 12 and functions to seal the tape player from dirt and sunlight.

Thus the invention provides a protective cover that completely encloses the visible exterior portion of a tape player or the like to conceal the tape player from a wouldbe thief. Additionally the face plate of the protective cover can be formed with the appearance and texture of an automotive dashboard and may be sloped or angled to conform to the angle of the dashboard. The face plate may be further modified with decals or other indicia to further enhance the illusion as part of the dashboard. Moreover, the size, shape and adjustable fastening arrangement of the protective cover allows a single protective cover to be fitted over a variety of tape player sizes and configurations.

It is apparent from the foregoing that a simple yet unobvious protective device for automotive tape players or the like has been provided. While only one presently preferred embodiment has been described in detail, as will be apparent to those familiar with the art, certain changes and modifications can be made without departing from the scope of the invention as defined by the following claims.

I claim:

1. A protective device for concealing the visible area of an automotive tape player mounted to a dashboard and having a tape cartridge opening and a plurality of control knobs, comprising:
   a face plate sized to substantially cover the visible exterior portion of the tape player;
   a generally tubular shaped extension member attached to said face plate and formed with a size and shape corresponding to said face plate and with a depth sufficient to enclose the control knobs of the tape player;
   a mounting blank sized to be placed in the tape cartridge opening of the tape player;
   adjustable fastening means for adjustably and hingedly attaching said mounting blank to said face plate such that said mounting blank may be inserted into the tape cartridge opening of the tape player and said face plate may be centered over the visible exterior portion of the tape player regardless of the positioning of the tape cartridge opening on the tape player and said face plate may be adjusted to conform to the dashboard, and said face plate may be folded flat against said mounting blank for storage.

2. The protective device as claimed in claim 1 and wherein:
   said adjustable fastening means comprises adhesive backed hook and loop fasteners attached to said mounting blank and an inner surface of said face plate to provide a flexible hinge.

3. The protective device as claimed in claim 2 and wherein:
   said face plate is sized and shaped to be removably attached to said extension member.

4. The protective device as claimed in claim 2 and wherein:
   said face plate and said extension member are formed as a unitary structure.

5. The protective device as claimed in claim 2 and wherein:
   decals are placed on an outside surface of said face plate.

6. The protective device as claimed in claim 5 further comprising:
   an abutment tab to provide a stop to prevent insertion of said mounting blank completely into the tape cartridge opening.

7. A protective device for concealing a dashboard mounted automotive tape player having a visible exterior portion, control knobs and an opening for a magnetic tape cartridge said protective device comprising:
   a generally flat generally rectangular shaped face plate formed of a material colored and textured to resemble an automotive dashboard;
   a four-sided generally rectangular shaped generally tubular extension member attached to said face plate and formed with a depth sufficient to enclose the control knobs of the tape player;
   a mounting blank formed in the general shape of a cassette tape sized to be placed into the tape cartridge opening of the tape player;
   adjustable hinge-like fastening means in the form of adhesive backed hook and loop fasteners for adjustably and hingedly attaching said mounting blank to an inside surface of said face plate; and
   indicia mounted to an outside surface of said face plate for disguising said face plate as a portion of the dashboard; whereby
   said mounting blank may be inserted and retained within the tape cartridge opening of the tape player with said face plate attached to said mounting blank and centered over the visible exterior portion of the tape player to conceal the tape player and adjusted to conform to the dashboard or folded flat against said mounting blank for storage.

8. The protective device as defined in claim 7 and wherein:
   said extension member is removably attached to said face plate.

9. The protective device as defined in claim 8 and wherein:
   said indicia comprises decals formed to resemble dashboard gauges.

10. The protective device as defined in claim 8 and wherein:
    a plurality of extension members may be formed with a depth corresponding in size to the control knobs of different tape players.

11. The protective device as defined in claim 7 and wherein:
    said mounting blank is formed with an abutment tab for forming a flat surface for attaching said mounting blank to said face plate and as a stop for preventing insertion of said mounting blank completely into the tape cartridge opening.

12. The protective device as defined in claim 7 and wherein:
said face plate is formed of hard plastic material textured to resemble car dashboard material.

13. In an automotive tape player mounted to a dashboard and including a visible exterior portion, an opening for receiving a magnetic tape cassette, and a plurality of control knobs, a protective device for disguising the tape player comprising:
a generally flat generally rectangular shaped face plate formed of plastic material and having an outside surface for substantially covering the visible exterior portion of the tape player, colored and textured to resemble the dashboard and having a 90 degree edge portion formed along the outer periphery;
a four sided tubular generally rectangular shaped extension member having a recessed outer edge shaped to receive the 90 degree edge portion of said face plate in a snap fit and sized with a depth to enclose the control knobs of the tape player;
a mounting blank formed in the general shape of a cassette tape cartridge for insertion into the tape cartridge opening of the tape player;
an adhesive backed "Velcro" fastener having an element attached to said mounting blank and a mating element attached to an inner surface of said face plate whereby said face plate may be removably, adjustably, or hingedly attached to said mounting blank substantially centered over the visible exterior portion of the tape player to disguise the tape player or said face plate may be folded flat against said mounting blank for storage; and
decals formed on an outside surface of said face plate.

14. The protective device as claimed in claim 13 and wherein:
said decals simulate automotive dashboard gauges.

15. The protective device as claimed in claim 14 and wherein:
a plurality of extension members are formed with different depth dimensions for mounting to different sized control knobs for different tape players.

16. The protective device as claimed in claim 15 and wherein:
said mounting blank is dimensioned to not engage or interfere with the internal functions of said tape player.

17. A protective device for concealing the visible area of an automotive electronic device mounted to a dashboard and having an opening and a visible exterior portion comprising;
a face plate sized to substantially cover the visible exterior portion of the electronic device;
a generally tubular shaped extension member attached to said face plate and formed with a size and shape corresponding to said face plate and with a depth sufficient to enclose the visible exterior portion of the electronic device;
a mounting blank sized to be placed in the opening of the electronic device;
adjustable fastening means for adjustably and hingedly attaching said mounting blank to said face plate such that said mounting blank may be inserted into the opening of the electronic device and said face plate may be centered over the visible exterior portion of the electronic device regardless of the positioning of the opening on the electronic device and said face plate may be adjusted to conform to the dashboard.

18. The protective device as claimed in claim 17 and wherein:
said adjustable fastening means comprises adhesive backed hook and loop fasteners attached to said mounting blank and an inner surface of said face plate to provide an adjustable attachment or a flexible hinge attachment.

19. The protective device as claimed in claim 18 and wherein:
said face plate is sized and shaped to be removably attached to said extension member.

20. The protective device as claimed in claim 17 and wherein:
said face plate and said extension member are formed as a unitary structure.

* * * * *